March 3, 1931.   A. M. JOSEPHO   1,794,382
PHOTOGRAPHIC FILM PACK AND DEVELOPER HOLDER THEREFOR
Filed June 22, 1928   3 Sheets-Sheet 1
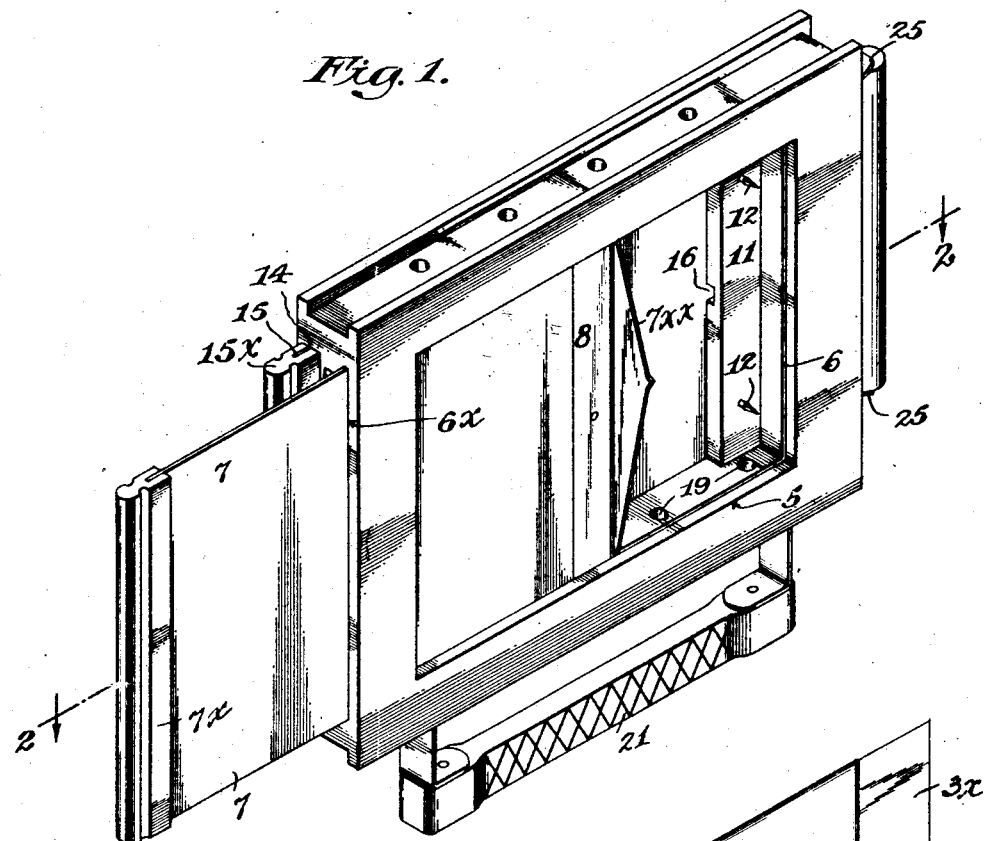
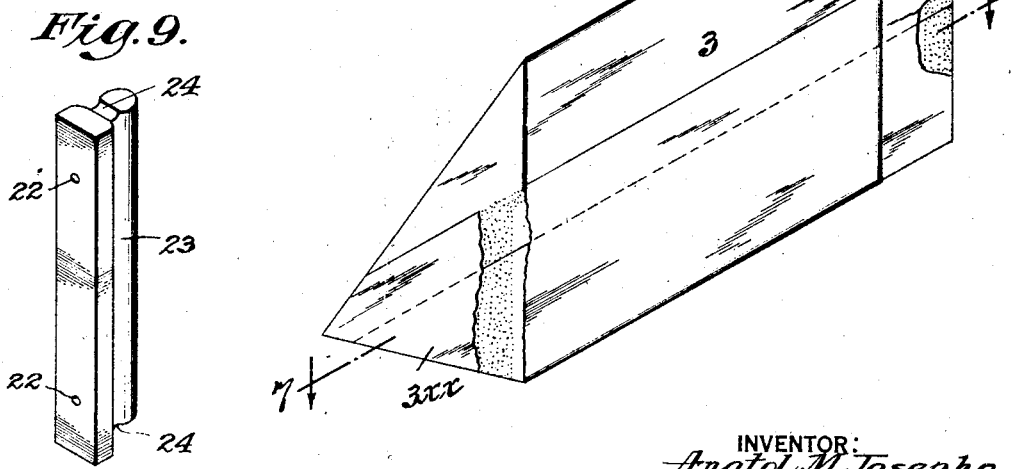
INVENTOR:
Anatol M. Josepho
BY
his ATTORNEY.

March 3, 1931.　　　A. M. JOSEPHO　　　1,794,382
PHOTOGRAPHIC FILM PACK AND DEVELOPER HOLDER THEREFOR
Filed June 22, 1928　　　3 Sheets-Sheet 2
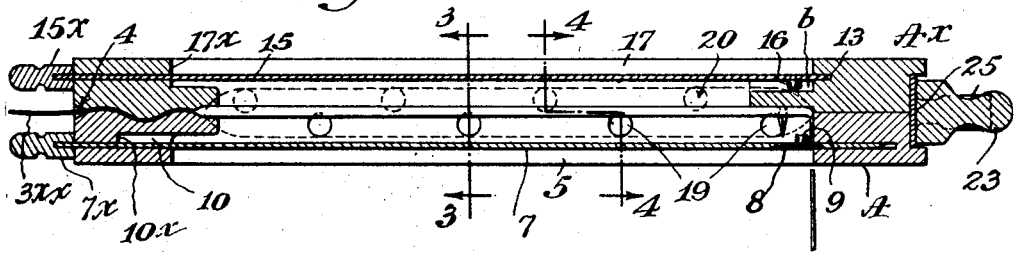
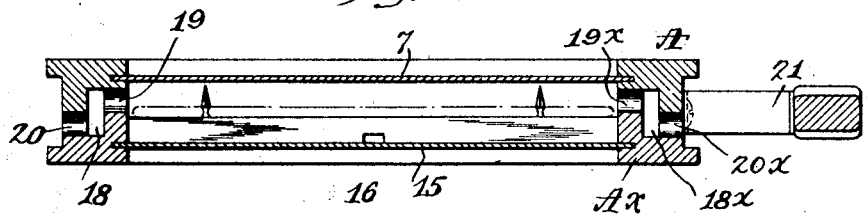
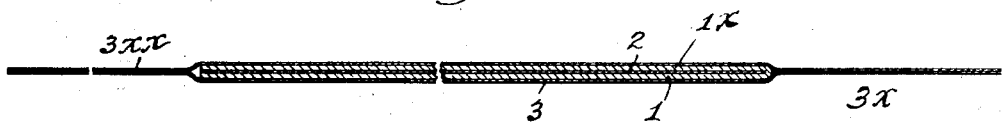
INVENTOR:
Anatol M. Josepho.
BY
ATTORNEY.

March 3, 1931.  A. M. JOSEPHO  1,794,382
PHOTOGRAPHIC FILM PACK AND DEVELOPER HOLDER THEREFOR
Filed June 22, 1928    3 Sheets-Sheet 3

INVENTOR:
Anatol M. Josepho
BY
his ATTORNEY.

Patented Mar. 3, 1931

1,794,382

UNITED STATES PATENT OFFICE

ANATOL M. JOSEPHO, OF NEW YORK, N. Y., ASSIGNOR TO MULTIPOSE PORTABLE CAMERAS LIMITED, OF LONDON, ENGLAND

PHOTOGRAPHIC-FILM PACK AND DEVELOPER HOLDER THEREFOR

Application filed June 22, 1928. Serial No. 287,385.

The object of the present invention is to provide a novel form of film pack and a holder particularly adapted for the same, the holder incidentally being operable as a developer.

The invention will be described with reference to the accompanying drawings in which—

Figure 1 is a perspective view of the developer-holder for the film pack;

Figure 2 is a horizontal section on the line 2—2, Fig. 1, showing the pack in position and after actuation of the slide-cutter;

Figure 3 is a vertical section on the line 3—3, Fig. 2;

Figure 4 is a vertical section on the line 4—4, Fig. 2;

Figure 6 is a perspective view of the film pack, partly in section;

Figure 7 is a horizontal section on the line 7—7, Fig. 6;

Figure 9 is a perspective view of the placement block;

Figure 8:
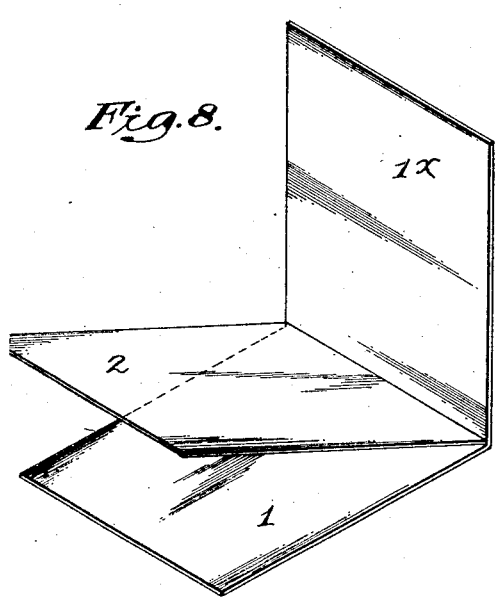
Figure 8 is a perspective view of the film strip partly folded and showing the intermediate black paper shield.

The film pack preferably consists of two film sheets shown at 1 and $1^x$, Fig. 8, which may be separate or formed by folding an emulsified sheet as is the case with the structure shown in said figure. The emulsified surface of the sheet is placed outermost and a sheet 2 of black or other light shielding material is placed intermediate the two. The film sheets are then placed in an envelope, the preferred form of which is shown in detail in Figs. 6 and 7.

The envelope may be formed by folding a sheet over the film sections so that it is lapped longitudinally and the ends thereof extend beyond the film. The rear end $3^x$ of the envelope 3 has its folds cemented together and the front end $3^{xx}$ likewise has its folds cemented together and may be square in shape, or pointed as indicated in Fig. 6. The relationship of the parts is clearly shown in the cross sectional view, Fig. 7.

The developer-holder for the film pack consists of a rectangular frame which may be made of two sections A, $A^x$, intermediate of which is formed a sinuous slot 4 to permit the passage of the front end film pack extension $3^{xx}$.

Section A is formed with an opening 5, at the margin of which is formed a rectangular slot 6 communicating with a front end opening $6^x$ to receive the slide-cutter 7. The slide-cutter may be provided with a handle $7^x$ for convenient manipulation. It is preferably formed as a steel blade having a pointed sharpened edge $7^{xx}$ and its outer face back of the pointed end may be channeled as at 8 for a purpose hereinafter to be explained. The slide cutter at its inner face may carry a stop stud 9 adapted, when the slide is merely retracted, to enter a passage-way 10 formed in member A and finally to contact with a stop wall $10^x$.

Rearwardly of slot 6 is an inwardly extended ledge 11 carrying the spaced pins 12. Back of ledge 11 member $A^x$ is formed with a rectangular slot 13, similar to slot 6, which communicates with a passage-way 14 for a slide 15, fitting in said slot 13, the slide having a handle $15^x$. Slide 15 carries a stop stud 16 adapted to engage with a shoulder 17 when the slide is moved outward to a predetermined degree and exposes a rectangular aperture $17^x$ formed in member $A^x$.

Extending longitudinally of the developer-holder at the base thereof is an internal passage-way 18 communicating with the space intermediate slides 7 and 15 by means of a series of ports 19 which are staggered with respect to a second series of ports 20 also communicating with passageway 18 and with the exterior of the developer-holder. In this manner the liquid may enter the developer-holder whilst light is barred therefrom.

At the top of the developer-holder is formed an internal passage-way 18ˣ communicating with a series of ports 19ˣ affording a communication between said passageway and the interior of the developer-holder intermediate plates 7 and 15. Said ports are offset from and staggered relatively to a plurality of ports 20ˣ affording communication to passage-way 18ˣ from the outside. The developer-holder may be provided with a handle 21 for convenient manipulation.

In the operation of the device, slide 7 is retracted and the film pack inserted through opening 5. This is done by placing the left hand pointed end (Fig. 6) of the pack into sinuous slot 4, from within opening 5 and then pushing said pointed end to the left until it emerges and lies in the position as shown in Fig. 2. In this position the end 3ˣ lies exterior opening 5 and the main body of the pack at its right hand end lies over and adjacent pins 12. The placement bar illustrated in Fig. 9 is then utilized. It consists of a flat face member having apertures 22 spaced correspondingly to the spacing of the pins 12 and the bar is provided with a handle 23 at each end of which is a notch 24. The handle is applied to the pack in such manner that openings 22 lie in register with pins 12. The bar is then pressed downwardly, causing the pins to penetrate through the pack and also causing end 3ˣ of the pack to be folded so that it extends outwardly and across slot 6. The placement bar is then removed. For convenience one end of the developer-holder may carry the spaced spring clips 25 so spaced that when the placement bar is pressed intermediate the same the clips will spring into notches 24 and hold the bar in position.

Figure 5:
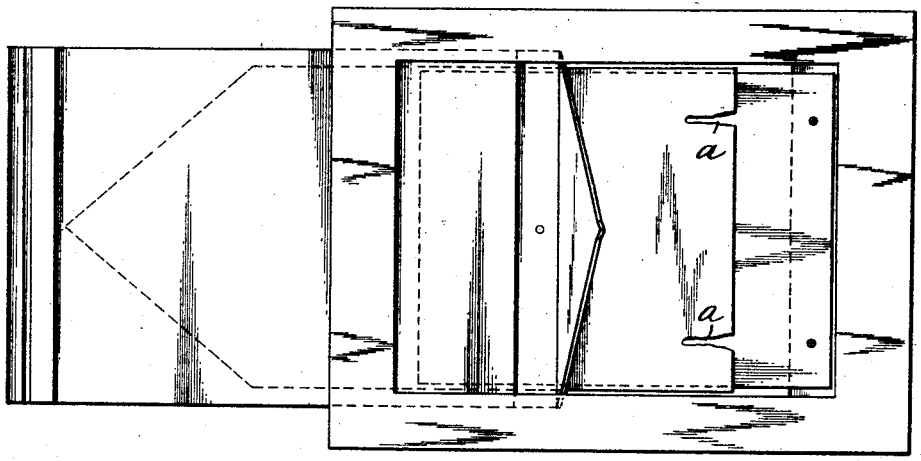
Figure 5 is a plan view of the developer-holder in position after the cutting operation of the envelope, after the envelope has been partly withdrawn and after the slide-cutter has been partly retracted.

In this position of the parts, slide-cutter 7 is moved to closed position. In doing so its pointed sharpened edge shears off end 3ˣ of the pack envelope rearwardly of the adhesive, and the envelope is opened and is held only by the pins 12, which pins also pass through the relatively heavy sensitized sheets. In order to remove the envelope it is only necessary to grasp the projecting end 3ˣˣ and pull the envelope outwardly. Those portions of the envelope to the right of the pins 12 will be torn away, as indicated at $a$, Fig. 5, and any tendency for the envelope to pull the sensitized sheets with it is resisted by the pins. The slides 7 and 15 remain closed during the removal of the envelope. When the envelope is removed there will be a sensitized surface opposite slide 7 and another sensitized surface opposite slide 15. The developer-holder may then be placed in a camera and the appropriate slide retracted so as to expose the appropriate sensitized surface to the image. Closing the slide and the reversal of the developer-holder, with the retraction of the second slide, will enable exposure of the second sensitized sheet to an image, as will be understood without further explanation.

I found that there is a tendency for the cutting end of slide 7 to carry the cut-off end of the envelope into the slot 6. To avoid such action it is only necessary to form a channel, such as channel 8, in the blade back of its cutting edge, as indicated in Figs. 1 and 2.

Figure 10:
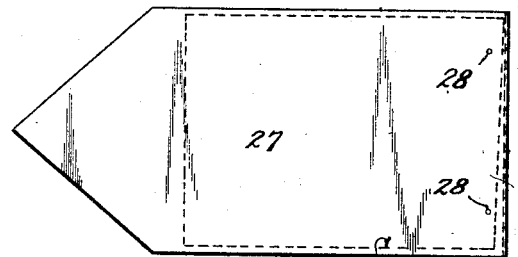
Figure 10 is a plan view of a modified form of film pack showing in dotted lines the position of the film.
Figure 11:
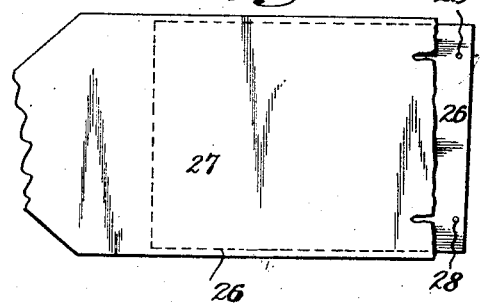
Figure 11 is a similar view showing the envelope of the said modified form of film pack partly withdrawn.

While I preferably employ a slide-cutter for severing an end of the envelope, such cutter is not an essential. For example, I may cut an end of each of the sensitized sheets obliquely as illustrated in Figs. 10 and 12, wherein the sensitized sheets are indicated at 26 and the envelope at 27. The envelope, being preferably formed of thin black paper will be acted upon by the rigid sensitized sheet (or sheets) as a shearing blade, the action being shown in Fig. 11 which indicates the envelope pulled partially away from the sensitized sheet 26 whilst the latter is held by the pins 28.

After the exposure of the sensitized sheet or sheets, the developer-holder may be immersed in the various developing, washing and fixing baths, which baths may be contained in narrow tanks or receptacles slightly wider than the developer-holder itself. By the offset and staggered slot arrangement, liquid will enter the developer-holder intermediate the plates 7 and 15 so that it may thoroughly contact with the sensitized and exposed sheets.

After the treatment of the exposed sheets, the slides in the meantime having shielded their emulsified surfaces from the light, slide 7 may be retracted and the sheets removed from pins 12. It will be noted that a channel $b$ has been formed in member Aˣ in order to afford clearance for pin 16 of slide 15 when the latter is moved forwardly into closed position.

It will be understood that various modifications may be made in the form and arrangement of the elements illustrated in the drawings without departing from the spirit of the invention, what I claim and desire to secure by Letters Patent being as follows:—

1. In devices of the character set forth, in combination with a sensitized sheet and a light-tight envelope enclosing the same, of a holder for the sheet, an image aperture in said holder, a closure for the aperture, pins adapted for impaling the sheet and envelope and a blade carried by said closure for shearing the envelope.

2. In devices of the character set forth, in combination with a sensitized sheet, a light-tight envelope enclosing the same, of a holder having an image aperture, means carried by the holder for impaling the sensitized sheet and envelope, and a slide closure for said image aperture, said closure having at one end a shearing blade for the envelope.

3. In devices constructed in accordance with claim 1 in which the closure rearwardly of the blade member is formed with a channel, as and for the purpose set forth.

4. In devices of the character set forth, in combination with a sensitized sheet and a light-tight envelope enclosing the same, of a holder for said sheet and envelope, the holder being formed with an image aperture, means for impaling the sheet and envelope, means for shearing the envelope and a sinuous passage-way formed in the holder to receive and permit withdrawal of the envelope whilst shielding the interior of the holder from light.

5. In devices of the character set forth, in combination with a sensitized sheet, and a light-tight envelope enclosing the same, of a holder for the sheet and envelope, said holder having pins for impaling the sheet and envelope, the holder having an image aperture, a slide for closing the image aperture, said slide carrying a knife for shearing the envelope, and a light-tight passageway for the envelope permitting withdrawal thereof after its shearing.

6. A device constructed in accordance with claim 5 including a placement block for effecting the impaling of the sheet and envelope, said block being formed with apertures spaced in accordance with the spacing of the pins.

In testimony whereof, I have signed my name to this specification.

ANATOL M. JOSEPHO.